June 23, 1925.  
F. F. KISHLINE  
HOUSING FOR UNIVERSAL JOINTS  
Filed March 30, 1923

1,543,575

Inventor  
Floyd F. Kishline  
By Alexander & Dowell  
Attorneys.

Patented June 23, 1925.

1,543,575

UNITED STATES PATENT OFFICE.

FLOYD F. KISHLINE, OF DETROIT, MICHIGAN, ASSIGNOR TO JOHN B. FLICK, OF DETROIT, MICHIGAN.

HOUSING FOR UNIVERSAL JOINTS.

Application filed March 30, 1923. Serial No. 628,811.

*To all whom it may concern:*

Be it known that I, FLOYD F. KISHLINE, a citizen of the United States, residing at Detroit, in the county of Wayne and State of Michigan, have invented certain new and useful Improvements in Housings for Universal Joints, and I hereby declare that the following is a full, clear, and exact description thereof, reference being had to the accompanying drawings, which form part of this specification.

This invention relates to universal couplings or joints, such as are commonly employed in automobile transmission mechanisms. Its objects are to eliminate the leather boots hertofore commonly used in such joints for excluding dirt and dust and for retaining the lubricant, and provide as a substitute therefor an all metal housing which will permit relative longitudinal and oscillatory movements of the member of the joint, and also to provide means for preventing entrance of dust into the joint and to prevent escape or dripping of grease from the joints.

In the accompanying drawings I have illustrated one practical embodiment of the invention, and will hereinafter describe the same with reference thereto, and summarize in the claims, the essentials of the invention, the novel features of construction and novel combinations of parts, for all of which protection is desired.

The invention is applicable to various forms of universal joints having two members, one member being the driving member, and the other the driven member of the joint, with one of the members telescoping the other, and said joint being provided with means causing the members to rotate in unison, while permitting longitudinal, and angular movement of the driven member, during rotation, with respect to the driving member.

Figure 3:
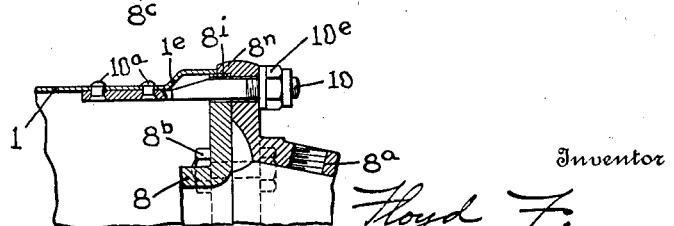
Fig. 3 is a detail sectional view of the means for fastening the metallic boot to the joint.

In the particular form of joint shown in the drawings the driving member comprises a casing composed of two separable parts 8, 8ª, which are arranged end to end and are flanged on their meeting edges and united by bolts and nuts 8ᵇ, transfixing the flanges, as shown in Figs. 5 and 3. The member 8 has a central bore and diametrically opposite slots 8ᶜ which are engaged by balls 9ᶜ on opposite ends of a pin 9ᵇ transfixing a head 9ª on the driven member or shaft section 9.

Figure 1:
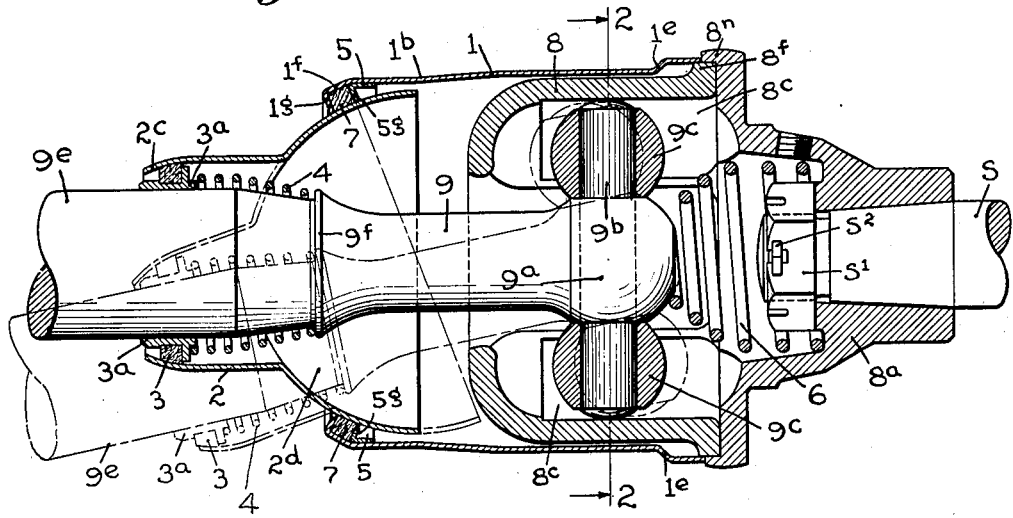
Fig. 1 is a longitudinal sectional view of a well known universal joint, with my novel, flexible, metallic boot or housing applied thereto.

A helical spring 6 may be interposed between the head 9ª and the adjacent face of the casing 8ª to normally press the shaft 9 outward. The slots and balls constitute a driving connection between the parts 8 and 9, and shaft 9 is also capable of oscillatory or angular movement relative to the part 8, as indicated in dotted lines in Fig. 1, this oscillatory movement being permitted by the movement of balls 9ᶜ in the slots 8ᶜ, and by the pivoting of the shaft 9 on the pin 9ᵇ at right angles to the slots, thus permitting a universal angular movement of shaft 9 relative to the casing 8. The slots 8ᶜ also permit of longitudinal movement of shaft 9 relative to part 8.

The part 8ª of the casing may be attached in the usual manner to a driving shaft S connected with the engine, as shown, the shaft S is preferably secured by a nut S' and locked by a cotter pin S² to the part 8ª whereby the casing is rotated and shaft 9 is rotated with the casing, while capable of oscillatory and longitudnal movements relative to the casing, as above described. The parts described are well known and need no further illustration or explanation, and the suitable universal joint per se may be any desired construction.

Ordinarily when applied to automobiles, a flexible so-called "boot" of leather or other flexible material is attached, at one end, to the open end of part 8, and at the other end, to the shaft 9. In the present invention I eliminate this flexible boot, and provide an all metallic boot or housing.

Figure 2:
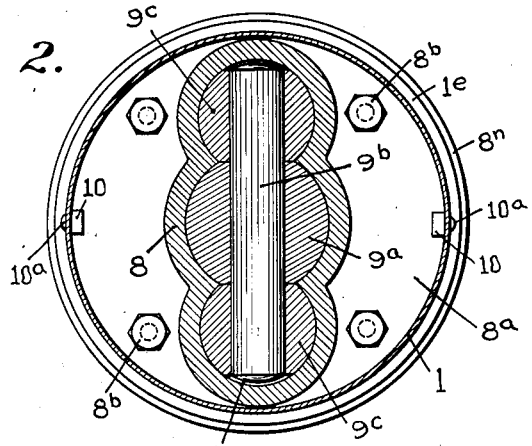
Fig. 2 is a transverse section on the line 2—2 Fig. 1.

This housing, as shown, comprises a cylindrical member 1 somewhat longer than the part 8 of the casing, and adapted to entirely surround and enclose part 8, and is secured thereto as indicated in Figs. 2 and 3. As shown, the inner end of housing member 1 is flared outwardly as at 1ᵉ, so as to fit over the slight peripheral flange 8ᶠ on the part 8, and against the flange 8ⁿ on part 8ᵃ, so as to make a neat joint. The member 1 projects beyond the end of part 8, and is preferably slightly contracted in diameter, as at 1ᵇ, and the outer end of the member 1 is slightly contracted as at 1ᶠ and has a shallow in-turned flange 1ᵍ on its outer end. Opposite this flange within the casing 1 is a flange 5ᵍ on a collar 5 which is preferably forced into place within the casing 1, and held in the position shown by friction. However the collar 5 may be rigidly secured within the casing if desired in any suitable manner as by electrical welding or any other means. In the space between flanges 1ᵍ, 5ᵍ is an annular packing 7 of cork or other suitable material. This packing or gasket 7 is adapted to form a close fit around the opposed parti-globular or parti-spherical end 2ᵈ of a complemental housing member.

The main body 2 of the complemental housing member is cylindrical but larger in diameter than the shaft 9, while the inner end thereof is formed into a parti-globular portion 2ᵈ which extends into the part 1 and makes a close fit exteriorly with the gasket 7.

The outer end of the complemental housing member projecting beyond the cylindrical part 2, is contracted, as shown at 2ᶜ, the part 2ᶜ being internally parti-globular, or parti-spherical and having a slightly larger diameter than the adjacent part 9ᵉ of shaft 9. In the construction shown, the part 9ᵉ of shaft 9 is of slightly larger diameter than is the part to which head 9ᵃ is attached. Slidably mounted on part 9ᵉ of the shaft is an annular gasket or ring 3ᵃ carrying a washer 3 which is preferably made of cork or other material and its outer surface is parti-globular or parti-spherical to fit within and against the opposed inner face of part 2ᶜ of the complemental housing member.

The washer 3 is maintained in close contact with the part 2ᶜ of the housing member by a suitable spring. As shown, a helical extension spring 4 is interposed between the gasket 3ᵃ and a collar 9ᶠ on the reduced portion of the shaft 9, said spring being slightly conical so that its inner end is smaller than the outer and will always bear against the collar 9ᶠ.

In the construction shown the part 8 is fastened to the part 8ᵃ by means of bolts 8ᵇ which extend through the meeting flanges on the meeting ends of the parts 8 and 8ᵃ, as indicated in Figs. 2 and 3. The bolt heads are concealed by the casing 1 hereinafter referred to, making a neat compact cylindrical appearance. The member 1 may be conveniently fastened in place by any suitable means, so that it cannot be moved longitudinally of the part 8. Preferably a very efficient means for fastening it is to rivet to the inner end of the part 1 the shanks of bolts 10, which are rigidly secured by rivets 10ᵃ; and the threaded ends of these bolts 10 project through openings 8ᵗ in part 8 adjacent the bolts 8ᵇ, and are secured by locking nuts and washers as indicated at 10ᵉ of the drawings. This holds the part 1 securely in position against the flange 8ⁿ of the part 8ᵃ.

It will be seen that while part 1 of the housing is fast to the part 8, part 2 of the housing is capable of universal movement relatively to, and at its junction with the washer 3ᵃ. By reason of this capability of angular movement of part 2, relative to the part 1 and the washer 3ᵃ and the latter's slidability on the shaft 9, the shaft 9 is permitted to freely move longitudinally and angularly with respect to casing 8 within certain limits, as indicated in dotted lines in Fig. 1. The extent of angular movement of part 9, relative to the casing 8, is amply sufficient to take care of all ordinary deflections of the joint in the practical operation or use of the universal joint.

The housing or boot thus permits ample flexibility of movement of the joint and effectively excludes dust from the joint and retains grease therein; and the housing does not at all interfere with the necessary free angular or longitudinal movements of the joint members in the practical operation thereof.

The aforesaid construction provides a very simple metallic housing or boot for a universal joint, adapted to readily accommodate itself to all angular positions of the members of the joint within a given radius, and to permit relative longitudinal play of the members of the coupling without injury to the housing or joint, and without opening the housing or joint, whereby dust will be effectively excluded therefrom and whereby the grease will be confined therein.

What I claim is:

1. In combination with a universal joint having a hollow casing, a shaft entering the hollow casing and a universal connection between the inner end of the shaft and the casing; of a metallic housing or boot comprising a housing member fixedly attached to the hollow casing; and having a contracted outer end; a second housing member loosely surrounding the shaft and having a partially globular inner end entering the outer end of the first housing member, and a washer in the first housing member engaging the exterior of the parti-globular portion of the second housing member; said second member also having its outer end formed parti-globular to engage an opposed slidable parti-globular member on the shaft.

2. A housing for universal joints, having a hollow casing, a shaft entering the hollow casing and a universal connection between the shaft and casing; said housing comprising a member fixedly attached at one end to the casing and having a contracted outer end; a second member loosely surrounding the shaft and having a parti-globular portion on its inner end telescoping the contracted end of the first member; said second member also having its outer end contracted and formed interiorly parti-globular, and a slidable washer on the shaft having an exterior parti-globular surface to engage the contracted outer end of the second member of the casing, substantially as described.

3. In combination with a universal joint having a hollow casing, a shaft entering the hollow casing and a universal connection between the inner end of the shaft and the casing; of a metallic housing or boot comprising a cylindric member fixedly attached at one end to the casing and having a contracted outer end; a second housing member loosely surrounding the shaft and having a parti-globular portion on its inner end telescoping the contracted end of the first member; said second member also having its outer end contracted and formed interiorly parti-globular; a washer attached to the contracted end of the cylindric member and engaging the exterior of the parti-globular enlargement of the second member, and a slidable washer on the shaft having an exterior parti-globular surface to engage the contracted outer end of the second member of the casing.

4. In combination with a universal joint having a casing, a shaft entering the casing and universal connection between the shaft and casing of a metallic housing or boot comprising a cylindric member fixedly attached to the casing and having a contracted outer end; a second housing member loosely surrounding the shaft and having its inner end formed with a parti-globular enlargement entering the outer end of the cylindric member; and a washer connected with the inner end of the cylindric member and engaging the parti-globular portion of the first member to make a close contact therewith; said second member also having its outer contracted parti-globular end movably engaged with a member slidably mounted on the shaft.

5. In combination with a universal joint comprising a casing, a shaft entering such casing, and a universal connection between the inner end of the shaft and the casing; of a metallic housing or boot comprising a member fixedly attached to the casing; a second member loosely surrounding the shaft and having a parti-globular inner end telescoping the outer end of the tubular member, and means maintaining a close joint between the said telescopic members; and a slidable member on the shaft engaging the outer end of the said second member; said slidable member on the shaft being a washer having an exterior parti-globular surface to slidably engage the opposed outer end of the second member of the casing; and a spring for normally forcing the washer outward.

6. In combination with a universal joint having a hollow casing, a shaft entering the hollow casing and a universal connection between the inner end of the shaft and the casing; of a metallic housing or boot comprising a housing member fixedly attached to the hollow casing; and having a contracted outer end; a second housing member loosely surrounding the shaft and having a partially globular inner end entering the outer end of the first housing member, and a washer in the first housing member engaging the exterior of the parti-globular portion of the second housing member; said second member also having its outer end formed to slidably engage an opposed slidable member on the shaft, said slidable member on the shaft being a washer having an exterior parti-globular surface to slidably engage the opposed outer end of the second member of the casing; and a spring for normally forcing the washer outward, substantially as described.

7. In combination with a universal joint having a casing, a shaft entering the casing and universal connection between the shaft and casing; of a metallic housing or boot comprising a cylindric member fixedly attached to the casing and having a contracted outer end; a second housing member loosely surrounding the shaft and having its inner end formed with a parti-globular enlargement entering the outer end of the cylindric member; a washer connected with the inner end of the cylindric member and engaging the parti-globular portion of the first member to make a close contact therewith; said second member also having its outer end movably engaged with a slidable member on the shaft, having an exterior parti-globular surface to engage the opposed similarly formed outer end of the second member of the casing; and a spring for normally forcing the washer outward, substantially as described.

In testimony that I claim the foregoing as my own, I affix my signature.

FLOYD F. KISHLINE.